United States Patent
Amuduri et al.

(10) Patent No.: US 12,165,451 B2
(45) Date of Patent: Dec. 10, 2024

(54) METHOD AND SYSTEM FOR PROVIDING ACCESS OF AN ACCESSING DEVICE TO A USER

(71) Applicant: Carrier Corporation, Palm Beach Gardens, FL (US)

(72) Inventors: Santhosh Amuduri, Telangana (IN); Mohan Reddy Dumbala, Telangana (IN); Adam Kuenzi, Salem, OR (US); Sumanth Kumar Mukundala, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/766,443

(22) PCT Filed: Sep. 29, 2020

(86) PCT No.: PCT/IB2020/059073
§ 371 (c)(1),
(2) Date: Apr. 4, 2022

(87) PCT Pub. No.: WO2021/064560
PCT Pub. Date: Apr. 8, 2021

(65) Prior Publication Data
US 2024/0054829 A1  Feb. 15, 2024

(30) Foreign Application Priority Data
Oct. 4, 2019  (IN) .............................. 201911040383

(51) Int. Cl.
G05B 19/00 (2006.01)
G05B 23/00 (2006.01)
(Continued)

(52) U.S. Cl.
CPC ......... *G07C 9/00571* (2013.01); *G06F 21/32* (2013.01); *G07C 9/00563* (2013.01); *G07C 2209/08* (2013.01)

(58) Field of Classification Search
CPC ............ G07C 9/00571; G07C 9/00563; G07C 2209/08; G06F 21/32
See application file for complete search history.

(56) References Cited

U.S. PATENT DOCUMENTS 6,345,180 B1 * 2/2002 Reichelt .............. H04W 52/288
                                                    455/574
9,508,206 B2 * 11/2016 Ahearn ............. G07C 9/00309
(Continued)

FOREIGN PATENT DOCUMENTS

WO   WO-2019117983 A1 *  6/2019  ........... G06F 21/629

OTHER PUBLICATIONS

International Search Report for Application No. PCT/IB2020/059073; Issued Nov. 24, 2020; 4 Pages.
(Continued)

*Primary Examiner* — Quang Pham
(74) *Attorney, Agent, or Firm* — CANTOR COLBURN LLP

(57) ABSTRACT

Aspects of the invention are directed towards a system and a method for providing access of an accessing device to a user. One or more embodiments of the invention describe the method comprising steps of detecting a charged status of a battery of a user device and prompting a user of the user device to define credentials when the charged status of the battery reaches below a pre-determined threshold. One or more embodiments of the invention further describe steps of receiving the defined credentials from the user to access an
(Continued)

accessing device and transmitting the defined credentials to a server for providing access of the accessing device to the user.

18 Claims, 4 Drawing Sheets

(51) Int. Cl.
| | | |
|---|---|---|
| G06F 7/00 | (2006.01) | |
| G06F 7/04 | (2006.01) | |
| G06F 21/32 | (2013.01) | |
| G06K 19/00 | (2006.01) | |
| G07C 9/00 | (2020.01) | |
| G08B 29/00 | (2006.01) | |
| G08C 19/00 | (2006.01) | |
| H04B 1/00 | (2006.01) | |
| H04B 3/00 | (2006.01) | |
| H04Q 1/00 | (2006.01) | |
| H04Q 9/00 | (2006.01) | |

(56) References Cited

U.S. PATENT DOCUMENTS

| | | | | |
|---|---|---|---|---|
| 9,710,987 | B2* | 7/2017 | Scoggins | G07C 9/28 |
| 9,882,404 | B2* | 1/2018 | Park | H02J 7/0063 |
| 10,358,319 | B2* | 7/2019 | Salmikuukka | B66B 1/2458 |
| 10,389,708 | B1* | 8/2019 | Goodsitt | H04M 3/51 |
| 10,475,263 | B1* | 11/2019 | Heller | G07C 9/38 |
| 10,499,244 | B1* | 12/2019 | Ziraknejad | H04L 63/08 |
| 10,654,684 | B2* | 5/2020 | Kronkvist | B66B 1/468 |
| 11,171,951 | B2* | 11/2021 | Gosalia | H04W 12/06 |
| 11,354,962 | B2* | 6/2022 | Tiwari | H04W 4/70 |
| 11,468,725 | B2* | 10/2022 | Tiwari | H04R 1/222 |
| 11,749,045 | B2* | 9/2023 | Coniff | G07C 9/28 |
| | | | | 340/5.7 |
| 11,751,016 | B2* | 9/2023 | Tiwari | G07C 9/00904 |
| | | | | 455/456.1 |
| 2003/0229499 | A1* | 12/2003 | Von Bosse | G10L 15/26 |
| | | | | 704/E15.045 |
| 2006/0014516 | A1* | 1/2006 | Cheng | H04B 1/1615 |
| | | | | 455/343.1 |
| 2008/0299938 | A1* | 12/2008 | Meshenberg | H04W 52/0261 |
| | | | | 455/343.2 |
| 2011/0296495 | A1 | 12/2011 | Smeets | |
| 2012/0083258 | A1* | 4/2012 | Rabii | H04W 52/0261 |
| | | | | 455/418 |
| 2013/0143500 | A1* | 6/2013 | Ghazarian | H04M 1/6066 |
| | | | | 455/41.3 |
| 2014/0049369 | A1* | 2/2014 | Ahearn | G07C 9/00309 |
| | | | | 340/5.61 |
| 2015/0199863 | A1* | 7/2015 | Scoggins | G07C 9/28 |
| | | | | 340/5.25 |
| 2016/0171808 | A1* | 6/2016 | Caterino | H04N 7/186 |
| | | | | 340/5.61 |
| 2016/0275480 | A1* | 9/2016 | Sanaboyina | H04W 4/02 |
| 2016/0304052 | A1* | 10/2016 | Naitou | E05B 81/74 |
| 2016/0323270 | A1* | 11/2016 | Anand | H04L 63/083 |
| 2017/0180345 | A1* | 6/2017 | Mohan | H04L 63/083 |
| 2017/0359334 | A1* | 12/2017 | Maddox | G10L 17/24 |
| 2018/0260567 | A1 | 9/2018 | Ullom | |
| 2019/0147157 | A1* | 5/2019 | Moorman | H04W 4/80 |
| | | | | 713/171 |
| 2019/0253255 | A1* | 8/2019 | Mani | G07C 9/00 |
| 2019/0310320 | A1* | 10/2019 | Lingala | G01R 31/392 |
| 2019/0362571 | A1* | 11/2019 | Jamesapollos | G07C 9/00571 |
| 2019/0369711 | A1* | 12/2019 | Wang | G06F 1/3212 |
| 2020/0043271 | A1* | 2/2020 | Anderson | H04N 7/186 |
| 2020/0186535 | A1* | 6/2020 | Naik | H04L 63/105 |
| 2020/0193752 | A1* | 6/2020 | Burris | H04L 63/12 |
| 2020/0334930 | A1* | 10/2020 | Masood | G07C 9/257 |
| 2021/0019966 | A1* | 1/2021 | Jarugumilli | H04W 4/02 |
| 2021/0029489 | A1* | 1/2021 | Bartucci | H04W 4/021 |

OTHER PUBLICATIONS

Written Opinion for Application No. PCT/IB2020/059073; Issued Nov. 24, 2020; 7 Pages.

* cited by examiner

METHOD AND SYSTEM FOR PROVIDING ACCESS OF AN ACCESSING DEVICE TO A USER

CROSS-REFERENCE TO RELATED APPLICATIONS

This application is a 371 U.S. National Stage application of PCT/IB2020/059073, filed Sep. 29, 2020, which claims the benefit of Indian application Ser. No. 201911040383, filed Oct. 4, 2019, both of which are incorporated by reference in their entirety herein.

TECHNICAL FIELD OF INVENTION

The present invention generally relates to accessing device/s. More particularly, the invention relates to a system and a method for providing access to a user using an accessing device.

BACKGROUND OF THE INVENTION

Traditionally, an accessing device (or a lock) is accessed by a user using a key. Along with usage of the key to access the accessing device, several other alternatives have been developed over the years to access the accessing device. One such alternative is usage of an access card by the user to access the accessing device. The access card is encoded by a staff personnel with credentials to access the accessing device and then issued to the user who eventually uses the access card to access the accessing device.

Another advanced alternative is usage of a user device (such as a mobile phone) by a user to access an accessing device. In order to use the user device to access the accessing device, the user may have to place the user device in proximity to the accessing device. Then, accordingly, the accessing device may provide access of the accessing device to the user. However, there may be a situation when battery of the user device may be drained due to which the user will not be able to use the user device to access the accessing device. In such a situation, the user will have to approach a staff personnel for issuing an access card or a key to access the accessing device. In such a case, the user uses the access card or a key to access the accessing device instead of the user device. This causes inconvenience to the user, wastes time of the user and the staff personnel and may also lead to frustration.

In view of the afore-mentioned problems in the existing solutions, there is a need of an efficient and an effective system and a method for providing access of an accessing device to a user. There is also a need for providing access of an accessing device when the battery of the user device is drained. In order to solve the problems in the existing solutions, a system and a method are disclosed.

SUMMARY OF THE INVENTION

Various embodiments of the invention describe a system for providing access of an accessing device to a user. The system comprises a user device and an accessing device. The user device comprises a detection unit adapted to detect a charged status of a battery of the user device. The user device also comprises an interface adapted to prompt a user of the user device to define credentials when the charged status of the battery reaches below a pre-determined threshold and also adapted to receive the defined credentials from the user. The user device further comprises a communication unit adapted to transmit the defined credentials to a server. The accessing device comprises a receiver adapted to receive the defined credentials from the server and an interface adapted to receive credentials from the user. The accessing device further comprises a processor adapted to validate the credentials with the defined credentials and an access unit adapted to provide access of the accessing device to the user based on the validation.

In an embodiment of the invention, the interface of the user device is further adapted to prompt the user of the user device to define a time window to access the accessing device. Moreover, the communication unit of the user device is further adapted to transmit the defined time window to the server.

In another embodiment of the invention, the user device determines a time window automatically to access the accessing device when the credentials are defined by the user.

In yet another embodiment of the invention, the defined time window corresponds to a time taken by the user to reach the accessing device after defining the credentials.

In still another embodiment of the invention, the receiver of the accessing device is adapted to receive the defined time window from the server.

In another embodiment of the invention, the server transmits the defined credentials and the defined time window to a camera. Moreover, the camera transmits the defined credentials and the defined time window to the accessing device.

In a different embodiment of the invention, the access unit is adapted to provide access of the accessing device to the user based on a positive validation and is adapted to restrict access of the accessing device to the user based on a negative validation.

In yet another embodiment of the invention, the interface of the accessing device receives the credentials from the user through a microphone associated with the accessing device.

In a different another embodiment of the invention, the user device activates a special mode arrival option for the user when the battery reaches below the pre-determined threshold. Further, the special arrival mode corresponds to using the defined credentials to access the accessing device by the user.

In a further yet another embodiment of the invention, the credentials comprise a password, a personal identification number, a rotation pattern for a handle associated with the accessing device, a voice command, an identification of the user by a camera, a biometric data or a combination thereof.

In yet another embodiment of the invention, the user device transmits the defined user credentials and the defined time window to the server through a mesh network or a cellular network.

In an embodiment of the invention, the communication unit adapted to transmit a notification to a front desk system for encoding an access card when the charged status of the battery reaches below a pre-determined threshold, wherein the encoded access card provides access of the accessing device to the user.

In another embodiment of the invention, the user device is adapted to receive an alert from the server after the access card is encoded to allow access of the accessing device to the user.

In yet another embodiment of the invention, the user device is adapted to transmit a cancellation request to the front desk system for cancelling the request to encode the access card when the charged status of the battery reaches above a second pre-determined threshold.

In still another embodiment of the invention, the detection of the charged status of the battery reaching below a pre-determined threshold is determined based on a location of the user device and a time required to reach the accessing device.

In a different embodiment of the invention, a method is disclosed for providing access of an accessing device to a user. The method comprises steps of detecting a charged status of a battery of a user device and prompting a user of the user device to define credentials when the charged status of the battery reaches below a pre-determined threshold. The method further comprising steps of receiving the defined credentials from the user to access an accessing device and transmitting the defined credentials to a server for providing access of the accessing device to the user.

In another embodiment of the invention, the user of the user device is prompted to define a time window to access the accessing device and the defined time window is transmitted to the server.

In yet another embodiment of the invention, the user device receives the defined time window from the user. Further, the time window corresponds to time taken by the user to reach the accessing device after defining the user credentials.

In another different embodiment of the invention, a computer readable medium is disclosed for providing access of an accessing device to a user. The computer readable medium comprises one or more processors and a memory coupled to the one or more processors, the memory storing instructions being executed by the one or more processors. The memory storing instructions which are executed by the one or more processors are configured to detect a charged status of a battery of a user device and prompt a user of the user device to define credentials when the charged status of the battery reaches below a pre-determined threshold. The memory storing instructions which are executed by the one or more processors are further configured to receive the credentials from the user to access an accessing device and transmit the defined credentials to a server for providing access of the accessing device to the user.

This summary is provided to introduce a selection of concepts in a simplified form from those that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which, taken in conjunction with the annexed drawings, disclose exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Figure 1:
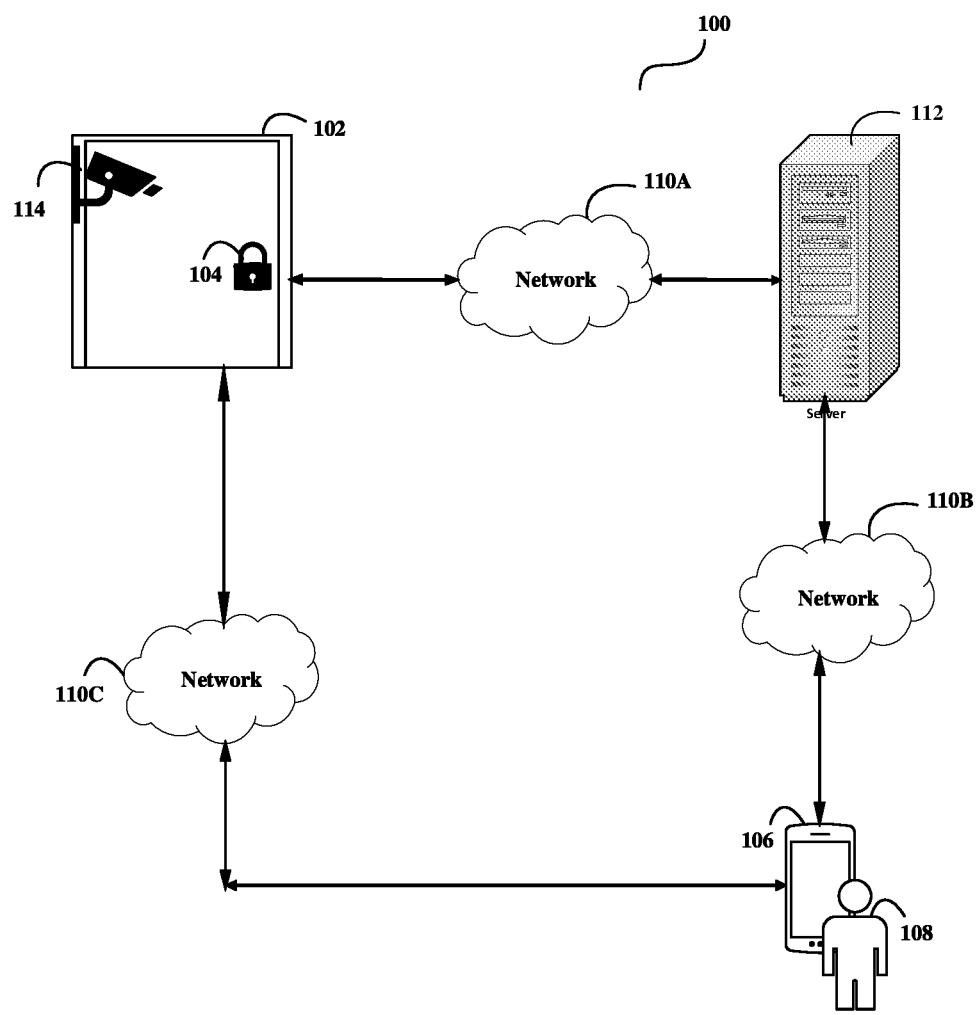
FIG. 1 depicts an exemplary system architecture according to an exemplary embodiment of the invention.

Described herein is technology with a system and a method for providing access of an accessing device to a user. The user may be prompted to define credentials and/or a time window when a charged status of battery of a user device reaches below a pre-determined threshold. The user may then use the defined credentials within the defined time window to access an accessing device.

As used herein, the accessing device may be a latching device and may be associated with a premises, a locker, a key-box or a vehicle. The accessing device may be connected with a server, a camera or with a user device through a network. The accessing device may be opened or closed by the user using the defined credentials within the defined time window. Moreover, the accessing device may be a smart lock, an electronic lock, an electro-mechanical lock, a mechanical lock or any such accessing device that is understood by a person skilled in the art. Also, the premises can be a room, a building or a floor where the lock can be installed.

As used herein, the credentials defined by the user may comprise, but is not limited to, a password, a personal identification number, a rotation pattern for a handle associated with the accessing device, a voice command, a biometric data, an identification of the user by a camera, or any such credentials well known in the art.

As used herein, the user device may be a desktop computer or a hand held device such as a mobile phone with network connectivity. Also, a user may be associated with the user device. Further, the user device may be connected with a server or with an accessing device through a network. Examples of the user device may include a stand-alone device, a computer, a desktop, a workstation PC, a laptop, a smart phone, a tablet, a wearable device and the like.

As used herein, the server has one or more processing capabilities and may also communicate with the accessing device, the camera or the user device through a network. Such server may be a cloud storage, a remote database, or any such storage known in the art.

As used herein, the network may refer to a mesh network, Global System for Mobile (GSM) network, a room management network, Long-Term Evolution (LTE) network, a code-division multiple access (CDMA) network, a narrowband internet of thing (NB-IoT) technique or category M1 technique, a bluetooth network, a WiFi network, a ZigBee network or any such network/technique that is known in the art.

Throughout the specification, reference numeral 110 depicts a single network. The reference numerals 110A, 110B, 110C . . . 110N may be considered as one or more networks.

FIG. 1 depicts a system architecture 100 for providing access of an accessing device to a user. As depicted in FIG. 1, a premises/locker/key-box/vehicle 102, an accessing device 104 associated with the premises/locker/key-box/vehicle 102, a server 112 connected with a network 110A/110B, a user 108 associated with a user device 106 connected with a network 110B/110C, and a camera 114 installed at the premises/locker/key-box/vehicle 102.

In an embodiment of the invention, the system architecture 100 may allow the user 108 to book a service, book an item or purchase an item. In a first exemplary embodiment, the user 108 may book a room in a hotel (i.e. premises) for a period of time or may book open/public space in the hotel. In a second exemplary embodiment, the user 108 may book a locker in a bank for a specific period. In a third exemplary embodiment, the user 108 may purchase a vehicle. In a fourth exemplary embodiment, the user 108 may purchase a key-box. In a fifth exemplary embodiment, the user 108 may book a vehicle/key-box for a specific period of time. When the user books an item, takes a service for a period of time or purchases the item, then the accessing device 104 associated with the premises/locker/key-box/vehicle 102 may be accessed by the user 108 using an application on a user device 106. Such an application may be stored in the user device 106. As used herein, such an application may be provided by a manufacturer/developer of an accessing device 104, a service-provider of a premises 102, an owner of a premises 102, a manufacturer/developer of the key-box 102, a manufacturer/developer of a vehicle 102 or any other such application associated directly or indirectly with the accessing device 104.

However, there may be a situation when the user 108 wants to access the accessing device 104 associated with the premises/locker/key-box/vehicle 102 using the user device 106, battery of the user device 106 may be drained by the time the user 108 reaches the premises/locker/key-box/vehicle 102. In such a situation, the user 108 may not be able to use the user device 106 to access the accessing device 104. In order to circumvent this problem, the user device 106 may detect that battery of the user device 106 is going to get drained shortly. The user device 106 may prompt the user 108 to define credentials as well as time-window to access the accessing device 104 if a charged status of a battery reaches below a pre-determined threshold. In an embodiment of the invention, the user device 106 may determine charged status of the battery. Then, the user 108 may define credentials and a time-window to access the accessing device 104. These defined credentials as well as defined time-window may be used by the user 108 to access the accessing device 104 even when the battery of the user device 106 is drained by the time the user 108 reaches the premises/locker/key-box/vehicle 102.

The present invention encompasses the user device 106 to detect a charged status associated with a battery, wherein the battery may be associated with the user device 106. The charged status associated with the battery corresponds to a level of charge or voltage of the battery. Several approaches well known in the art may be used to detect the charged status of the battery. In an embodiment, the user device 106 may periodically detect the charged status of the battery. For an instance, the user device 106 may detect the charged status of the battery in every 30 minutes. In an alternative embodiment, the user device 106 may detect the charged status of the battery based on an occurrence of an event. For an example, the user device 106 may detect the charged status of the battery when the user 108 opens an application stored in the user device 106. The period or the event for detecting the charged status of the battery may be configured by the user 108, a developer of the application stored in the user device 106, or a manufacturer of the user device 106.

In an exemplary embodiment, when the user device 106 detects that the charged status of the battery has reached below a pre-determined threshold, the user device 106 may prompt the user 108 of the user device 106 to define credentials to access the accessing device 104. On detecting that the battery associated with user device 106 has reached below the pre-determined threshold, the user device 106 may automatically activate a special mode arrival option for the user 108 to provide the prompt to the user 108. The special arrival mode may correspond to enabling the user 108 to define credentials and a time window to access the accessing device 104 and using credentials defined by the user 108 to access the accessing device 104.

In an exemplary embodiment, the pre-determined threshold may be defined as 20% of charge or voltage in the battery. Considering this example, when the user device 106 detects that a charged status of the battery is at 20% charge/voltage or below, then the user device 106 may provide a prompt the user 108. Such a pre-determined threshold may be configured at any value by the user 108, a developer of the application stored in the user device 106, or a manufacturer of the user device 106. Also, the user device 106 may prompt the user 108 of the user device 106 through the application stored in the user device 106.

In an alternative exemplary embodiment, when the user device 106 detects that the charged status of the battery has reached below a pre-determined threshold, the user device 106 (using the application) may transmit a notification to a front desk system for encoding an access card. On receiving the notification, a staff personnel at the front desk system may encode an access card that may provide access of the accessing device 104 to the user 108. After the access card is encoded, the front desk system may transmit an alert to the user device 106 for informing the user 108 regarding the encoded access card. For an instance, the front desk system may send an alert like "As your device battery is low, we have encoded an access card for allowing the access of the accessing device. Please collect the access card from a reception".

Now, when the user 108 reaches a place where the accessing device 104 is associated with the premises/locker/key-box/vehicle 102, the user 108 may collect the encoded access card from the reception and use the encoded access card to access the accessing device 104. Further, the present invention also encompasses the user device 106 and the front desk system to communicate through a server 112. Furthermore, the alert to the user 108 may be provided through a text message, a voice message, an email message, a social media account or any such medium well known in the art.

As used herein, the front desk system may be associated with a staff personnel. The front desk system may be a desktop computer or a hand held device such as a mobile phone with network connectivity. Example of the front desk system includes a desktop, workstation PC, a laptop, a smart phone, a tablet, a wearable device and the like.

When the user 108 views the prompt on the user device 106, the user 108 may define credentials to access the accessing device 104. In a first exemplary embodiment, the user 108 may define a password (may be an alphanumeric or a numeric, alphabetical password) to access the accessing device 104. In a second exemplary embodiment, the user 108 may define a personal identification number (PIN) to access the accessing device 104. In a third exemplary embodiment, the user 108 may define a voice command message using a microphone of the user device 106 to access the accessing device 104. In a fourth exemplary embodiment, the user 108 may define a text message to access the accessing device 104. In a fifth exemplary embodiment, the user 108 may define a rotation pattern for a handle associated with the accessing device 104 to access the accessing device 104 (such as, for an instance, rotate a handle of the accessing device 3 times in a clockwise direction). In a sixth exemplary embodiment, the user 108 may define a biometric data to access the accessing device 104. The present invention also facilitates the user 108 to define more than one credential at a time to access the accessing device 104.

Moreover, the user device 106 may prompt the user 108 of the user device 106 to define a time window to access the accessing device 104. The user 108 may also define a time window along with the credentials to access the accessing device 104. The defined time window may correspond to a time taken by the user 108 to reach the accessing device 104 after defining the credentials. For an instance, the user 108 may define a time window of 30 minutes to reach the accessing device 104. In an alternative embodiment, the user device 106 may automatically determine a time window to access the accessing device 104 when the credentials are defined by the user 108. For this, the user device 106 may determine a current location of the user device 106 using a global positioning system (GPS) of the user device 106 or any location sensor of the user device 106. Then, the user device 106 may also determine a distance between the current location of the user 108 and a location of the accessing device 104. In another embodiment, user device 106 may use advertisement/s or signal/s from a beacon placed in a premises to determine a current location of the user device 106. Such embodiment is used only when the user device 106 is present inside the premises. Accordingly, the user device 106 automatically determines a time window (i.e. a time taken by the user 108 to reach the location of the accessing device 104) to access the accessing device 104. In addition, the user device 106 may also consider traffic and weather conditions (based on the location of the user 108 and the accessing device 104) to automatically determine a time window to access the accessing device 104. Also, the user 108 may edit a time window defined by him/her or a time window automatically determined by the user device 106. The present invention facilitates providing the prompt to the user 108 for defining the credentials and the time window to access the accessing device 104 only when the user 108 has booked a service associated with the accessing device 104 for a period of time, books an item for a specific period of time or purchases an item associated with the accessing device 104. In a first exemplary embodiment, the user 108 may receive a prompt only when the user 108 has booked a room in a hotel (i.e. premises) or may book an open/public space in the hotel where the accessing device 104 is located. In a second exemplary embodiment, the user 108 may receive a prompt only when the user 108 has booked a locker in a bank where the accessing device 104 is present. In a third exemplary embodiment, the user 108 may receive a prompt only when the user 108 has purchased a vehicle having the accessing device 104. In a fourth exemplary embodiment, the user 108 may receive a prompt only when the user 108 has purchased a key-box having the accessing device 104. In a fifth exemplary embodiment, the user 108 may receive a prompt only when the user 108 has booked a vehicle/key-box 102 for a specific period of time.

When the user 108 defines the credentials and the time window, the user device 106 may receive the defined credentials and the defined time window from the user 108. Then, the user device 106 may transmit the defined credentials and the defined time window to the server 112 through the network 110B. In a first exemplary embodiment, the server 112 may, in turn, transmit the defined credentials and the defined time window to the accessing device 104 through the network 110A. Also, the server 112 may transmit the defined credentials and the defined time window to the accessing device 104 on a request from the accessing device 104. The server 112 may also store the defined credentials and the defined time window received from the user device 106. Also, the server 112 may delete or remove the defined credentials and the defined time window after an expiration of a period of time during which the user 108 takes a service or after the user 108 sold a vehicle/key-box purchased by him/her.

In a second exemplary embodiment, the server 112 may transmit the defined credentials and the defined time window to the camera 114 through the network 110A, wherein the camera 114 may be installed at a proximate location to the accessing device 104. The camera 114 may transmit the defined credentials and the defined time window to the accessing device 104. The camera 114 may also identify the user 108 who is accessing the accessing device 104 if the user 108 has opted for such an option while defining the credentials. In a third exemplary embodiment, the user device 106 may transmit the defined credentials and the defined time window to the accessing device 104 through the network 110C. Accordingly, the accessing device 104 may receive the defined credentials and the defined time window from the server 112 or the camera 114 through the network 110A or directly from the user device 106 through the network 110C.

Different embodiments of the invention further facilitates the user device 106 to transmit, to the server 112 or the camera 114 or the accessing device 104, information or an identifier of the application through which the user 108 generally accesses the accessing device 104. In a first exemplary embodiment, the user device 106 may transmit hotel booking information (such as, a room number allocated to the user 108, period of stay, name of the user 108 or an identity of the user 108) to the server 112/camera 114/accessing device 104. In a second exemplary embodiment, the user device 106 may transmit locker booking information (such as, a number of the locker allocated to the user 108, booking duration, name of the user 108 or an identity of the user 108) to the server 112/camera 114/accessing device 104. In a third exemplary embodiment, the user device 106 may transmit vehicle purchasing information (such as, a vehicle number, date of purchase, name of the user 108 or an identity of the user 108) to the server 112/camera 114/accessing device 104. In a fourth exemplary embodiment, the user device 106 may transmit key-box purchasing information (such as, a key-box number, date of purchase, name of the user 108 or an identity of the user 108) to the server 112/camera 114/accessing device 104. In a fifth exemplary embodiment, the user device 106 may transmit key-box/vehicle booking information (such as, a key-box/vehicle number, date of booking, period of booking, name of the user 108 or an identity of the user 108) to the server 112/camera 114/accessing device 104.

When the user 108 reaches a place where the accessing device 104 is associated with the premises/locker/key-box/vehicle 102, the user 108 may use the defined credentials to access the accessing device 104. The user 108 may enter credentials in the accessing device 104 through an interface or a microphone associated with the accessing device 104. When the accessing device 104 receives the credentials from the user 108, the accessing device 104 may validate the credentials received from the user 108. To validate the credentials received from the user 108, the accessing device 104 may compare the credentials received from the user 108 and the defined credentials received from the server 112/camera 114 through the network 110A or from the user device 106 through the network 110C (as discussed above). The accessing device 104 may provide access of the accessing device 104 to the user 108 based on the validation. In an event, the credentials received from the user 108 and the defined credentials received from the server 112/camera 114/user device 106 matches, then the accessing device 104 may provide access of the accessing device 104 to the user 108. If the credentials received from the user 108 and the defined credentials received from the server 112/camera 114/user device 106 do not match, then the accessing device 104 may not provide access of the accessing device 104 to the user 108. Along with comparing the credentials received from the user 108 and the defined credentials received from the server 112/camera 114/user device 106, the accessing device 104 may also determine if the credentials received from the user 108 are within the defined time window. If the credentials received from the user 108 are within the defined time window, then the accessing device 104 may provide access of the accessing device 104 to the user 108. If the credentials received from the user 108 are not within the defined time window, then the accessing device 104 may not provide access of the accessing device 104 to the user 108.

The present invention facilitates the accessing device 104 to deny access of the accessing device 104 to the user 108 after the expiration of the defined credentials. In a first exemplary embodiment, the defined credentials for accessing a lock of a room may expire after an expiration of booking period for the room in a hotel (i.e. premises) or for open/public space in the hotel. In a second exemplary embodiment, the defined credentials for accessing a lock of a locker in the bank may expire after an expiration of booking period for the locker in the bank. In a third exemplary embodiment, the defined credentials for accessing a lock of a vehicle may expire after the user 108 sold the vehicle owned by him/her. In a fourth exemplary embodiment, the defined credentials for accessing a lock of a key-box may expire after the user 108 sold the key-box owned by him/her. In a fifth exemplary embodiment, the defined credentials for accessing a lock of a vehicle/key-box may expire after the expiration of a booking period of the vehicle/key-box.

The present invention further facilitates the user device 106 to detect that the charged status of the battery is reaching below a pre-determined threshold based on a location of the user device 106 and a time required to reach the accessing device 104. Accordingly, based on the location of the user device 106 and the time required to reach the accessing device 104, the user device 106 may or may not send any request to encode an access card to the front-desk system. Also, the user device 106 may or may not prompt user to define credentials to access the accessing device 104 based on the location of the user device 106 and the time required to reach the accessing device 104. For this, the user device 106 may determine a current location of the user device 106 using a global positioning system (GPS) of the user device 106 or any location sensor of the user device 106. Then, the user device 106 may also determine a distance between the current location of the user 108 and a location of the accessing device 104. The user device 106 may also automatically determine a time to be taken by the user 108 to reach the location of the accessing device 104. In addition, the user device 106 may also consider traffic and weather conditions (based on the location of the user 108 and the accessing device 104) to determine whether the charged status of the battery is reaching below the pre-determined threshold. For an example, if the user device 106 is only 1 miles away from the accessing device 104 and the time to be taken by the user 108 to reach the location of the accessing device 104 is 1 minutes, then, the user device 106 may not send any request to encode an access card to the front-desk system or may not prompt user to define credentials to access the accessing device 104.

The present invention also facilitates the user device 106 to cancel a request to encode an access card or to cancel a request for using defined credentials to provide access of the accessing device 104 in case the battery is recharged by the user 108. For this, the user device 106 may transmit a cancellation request to the front desk system for cancelling the request to encode the access card when the charged status of the battery reaches above a second pre-determined threshold. Alternatively, the user device 106 may transmit a cancellation request to the accessing device 104 for cancelling the request to use defined credentials for providing access of the accessing device 104 when the charged status of the battery reaches above a second pre-determined threshold. As used herein, the second pre-determined threshold may be defined may be configured at any value by the user 108, a developer of the application stored in the user device 106, or a manufacturer of the user device 106. For an instance, the second pre-determined threshold may be defined at 30% above which the cancellation request may be transmitted by the user device 106 to the front desk system or the accessing device 104.

The present invention also facilitates the user device 106 for not sending any request to encode an access card to the front-desk system or the user device 106 may not prompt the user 108 to define credentials to access the accessing device 104 if the user 108 is miles apart from the accessing device 104 and would take a greater amount of time to reach the accessing device 104. For this, the user device 106 may consider a mode of travel being adopted by the user 108 to reach the accessing device 104. The mode of travel includes, but is not limited to, an airplane travel mode, a walking travel mode, a car travel mode, a two-wheeler travel mode or any such mode well known in the art. For an instance, if the user 108 is 200 miles away from the accessing device 104, and is in airplane travel mode, then, the user device 106 may not send any request to encode an access card to the front-desk system or may not prompt the user 108 to define credentials to access the accessing device 104.

Although the present invention has been described with respect to the accessing device 104, the server 112 and the user device 106 communicating with each other through the networks 110A/110B/110C as described above; however, it is understood for a person skilled in the art that these networks 110A/110B/110C can be same networks or can be different networks as well.

Figure 2:
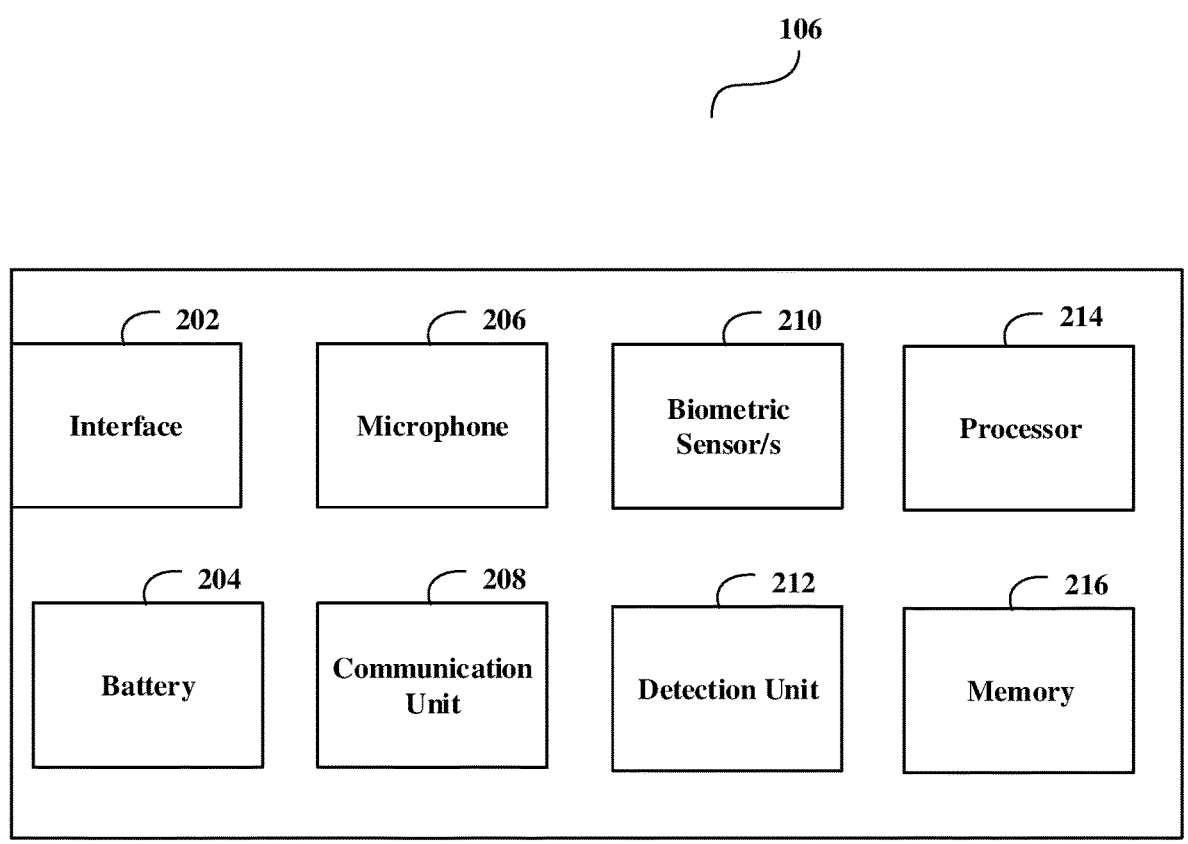
FIG. 2 depicts a block diagram of different components of a user device according to an exemplary embodiment of the invention.

FIG. 2 depicts a block diagram of different components of a user device 106 according to an exemplary embodiment of the invention. The user device 106 may comprise of, but is not limited to, an interface 202, a battery 204, a microphone 206, a communication unit 208, a biometric sensor/s 210, a detection unit 212, a processor 214 and a memory 216. The detection unit 212 of the user device 106 may be adapted to detect a charged status associated with the battery 204. The detection unit 212 may also be adapted to indicate or transmit the charged status associated with the battery 204 to a processor 214. The processor 214 may be adapted to determine if the charged status associated with the battery 204 is below the pre-determined threshold by comparing the charged status associated with the battery 204 with the pre-determined threshold. If the processor 214 determines that the charged status associated with the battery 204 is below the pre-determined threshold, the processor 214 may transmit a request to an application stored in the user device 106 for activating a special arrival mode. After the processor 214 determines that the application has activated the special arrival mode, then the processor 214 request the interface 202 to provide a prompt to the user 108. The interface 202 may be adapted to prompt the user 108 of the user device 106 to define credentials and/or define a time window to access the accessing device 104. In an exemplary embodiment, the user 108 may use the microphone 206 of the user device 106 to define a voice command message as a credential to access the accessing device. In another exemplary embodiment, the user 108 may use a keypad of the user device 106 to define a text, a pin, or a password as credentials to access the accessing device 104.

In a different exemplary embodiment, the user 108 may use the biometric sensors 210 (such as fingerprint sensor) of the user device 106 to define biometric data as credentials to access the accessing device 104. The interface 202 may also be adapted to receive the defined credentials as well as the defined time window from the user 108 and provide the defined credentials as well as the defined time window to the communication unit 208. The communication unit 208 may be adapted to transmit the defined credentials and the defined time window to a server 112/camera 114/the accessing device 104 through a network 110. In an embodiment, the communication unit 208 may be a short-range transceiver. In an alternative embodiment, the communication unit 208 may be a long-range transceiver. The memory 216 may be adapted to store the application, the defined credentials, and/or the defined time window etc. Moreover, the interface 202, the battery 204, the microphone 206, the communication unit 208, the biometric sensor/s 210, the detection unit 212, and/or the memory 216 may be communicably coupled with the processor 214.

In an embodiment of the invention, the different components of the user device are exemplary. One or more tasks associated with the invention may be enabled using a single component configured to perform the tasks executed by the different components. Likewise, one or more tasks may be performed by the components alone or in combination.

Figure 3:
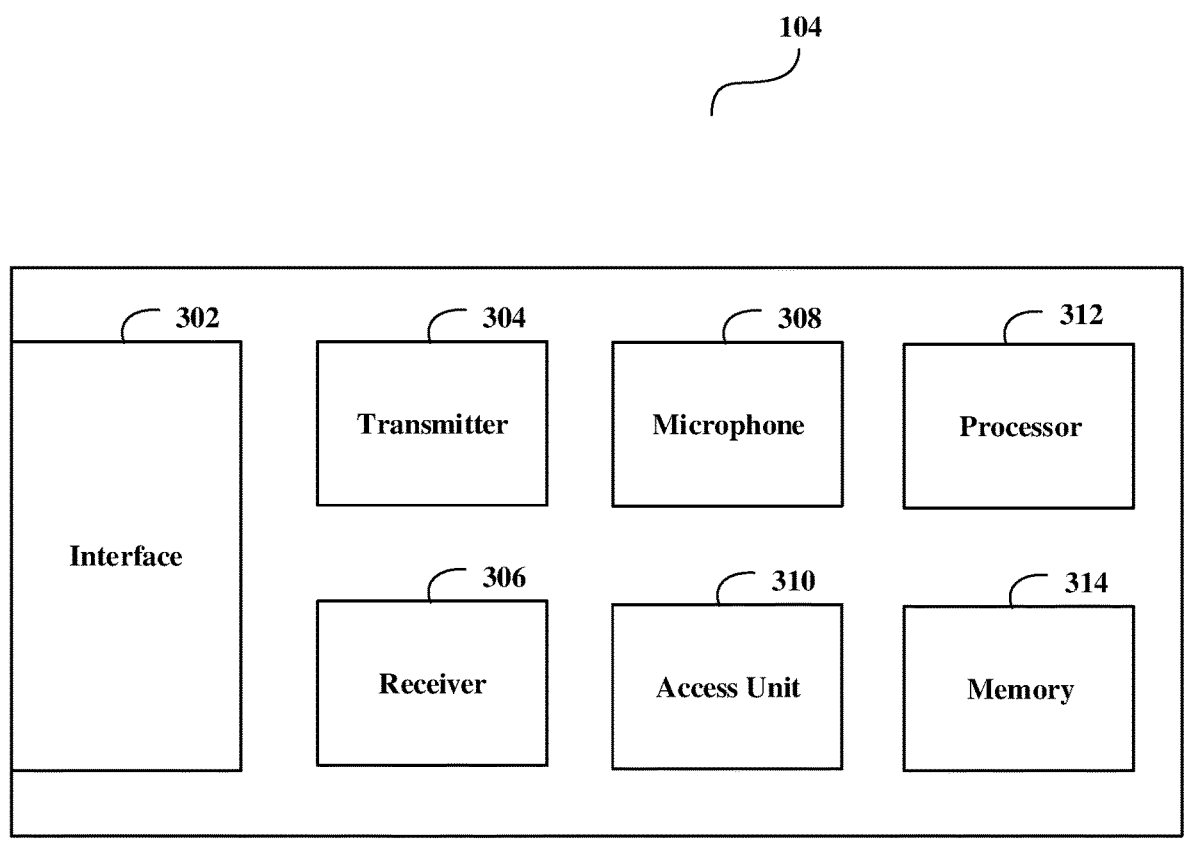
FIG. 3 depicts a block diagram of different components of an accessing device according to an exemplary embodiment of the invention.

FIG. 3 depicts a block diagram of different components of an accessing device 104 according to an exemplary embodiment of the invention. The accessing device 104 may comprise of, but is not limited to, an interface 302, a transmitter 304, a receiver 306, a microphone 308, an access unit 310, a processor 312 and a memory 314. The receiver 306 of the accessing device 104 may be adapted to receive the defined credentials and the defined time window from a server 112/camera 114/user device 106 through a network 110. The interface 302 may be adapted to receive credentials from a user 108 when the user 108 inputs credentials in the accessing device 104. In an exemplary embodiment, the user 108 may use the microphone 308 of the accessing device 104 to provide a voice command message as input credentials to the accessing device 104. In another exemplary embodiment, the user 108 may use a keypad of the user device 106 to provide a text, pin, password as input credentials to the accessing device 104. In a different exemplary embodiment, the user 108 may use a biometric sensor of the accessing device 104 to provide biometric data as input credentials to the accessing device 104. Then, the interface 302 may also be adapted to receive the credentials from the user 108 and may provide the credentials received from the user 108 to the processor 312. The processor 312 may then validate the credentials received from the user 108 with the defined credentials received from the server 112/camera 114/user device 106 through a network 110. In particular, the processor 312 may compare the credentials received from the user 108 with the defined credentials received from the server 112 or the camera 114 or the user device 106. In an event, the credentials received from the user 108 matches with the defined credentials received from the server 112/camera 114/user device 106, then the processor 312 may provide a positive indication to the access unit 310 of the accessing device 104. If the credentials received from the user 108 do not match with the defined credentials received from the server 112/camera 114/user device 106, then the processor 312 may provide a negative indication to the access unit 310 of the accessing device 104. The access unit 310 may be adapted to provide the access of the accessing device 104 to the user 108 if the access unit 310 receives the positive indication from the processor 312.

Alternatively, the access unit 310 may be adapted to restrict the access of the accessing device 104 to the user 108 if the access unit 310 receives the negative indication from the processor 312. Further, the transmitter 304 may be adapted to transmit any request to the server 112. In an embodiment, the transmitter 304 or the receiver 306 may be a short-range transmitter/receiver. In an alternative embodiment, the transmitter 304 or the receiver 306 may be a long-range transmitter/receiver. The memory 314 may be adapted to store the defined credentials and the defined time window received from the server 112/camera 114/user device 106. Moreover, the interface 302, the transmitter 304, the receiver 306, the microphone 308, the access unit 310, and/or the memory 314 may be communicably coupled with the processor 312.

Figure 4:
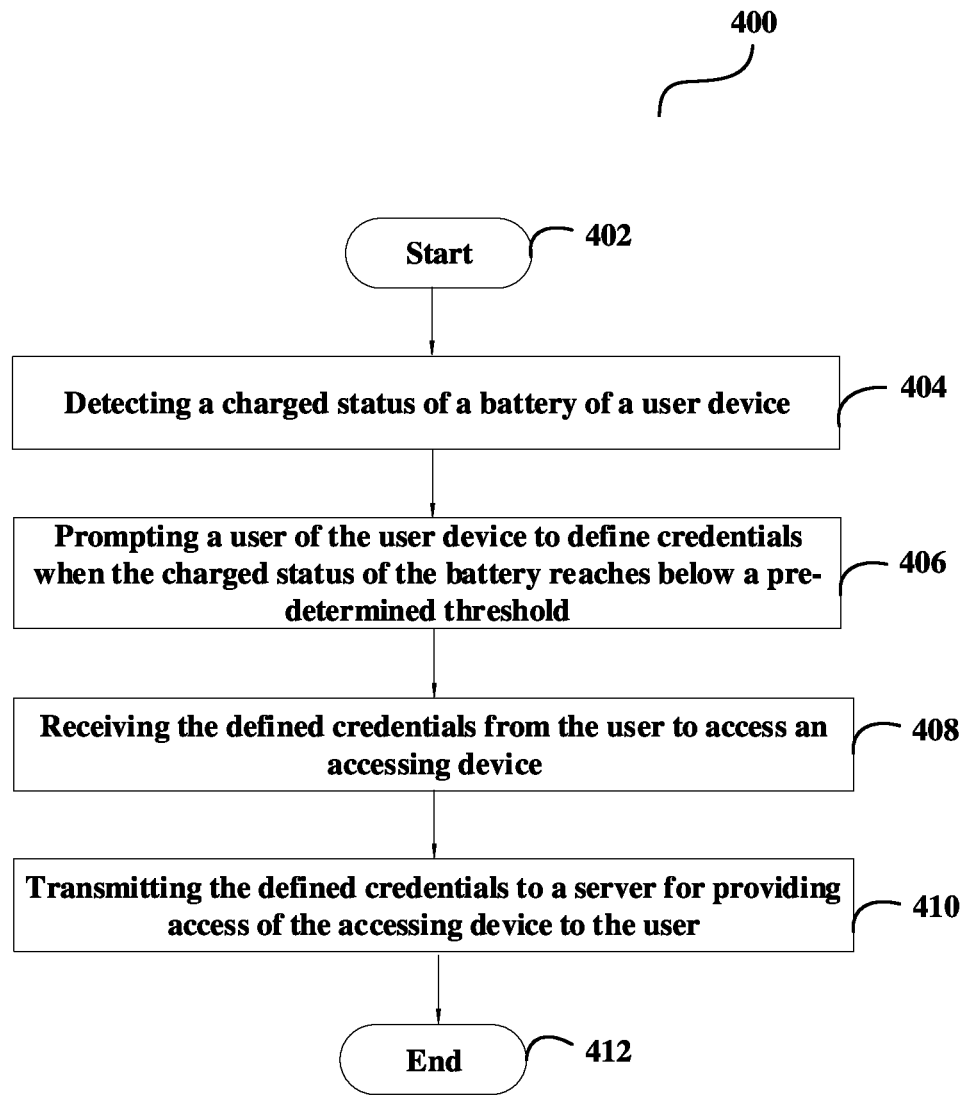
FIG. 4 depicts an exemplary flowchart illustrating a method to perform the invention according to an exemplary embodiment of the invention.

FIG. 4 depicts a flowchart outlining the features of the invention in an exemplary embodiment of the invention. The method flowchart 400 describes a method being performed for providing access of an accessing device 104 to a user 108. The method flowchart 400 starts at step 402.

At step 404, the user device 106 may detect a charged status of a battery 204, wherein the battery 204 may be associated with the user device 106. The charged status associated with the battery 204 corresponds to a level of charge inside the battery 204. Several approaches well known in the art may be used to detect the charged status of the battery 204.

At step 406, the user device 106 may prompt a user 108 of the user device 106 to define credentials to access the accessing device 104 when the user device 106 detects that the charged status of the battery 204 reaches below a pre-determined threshold. On detecting that the battery associated with user device 106 reaches below the pre-determined threshold, the user device 106 may activate a special mode arrival option for the user 108 for providing the prompt to the user 108. The special arrival mode may correspond to enabling the user 108 to define credentials as well as a time window to access the accessing device 104 and using credentials defined by the user 108 to access the accessing device 104. Moreover, the user device 106 may also prompt the user 108 of the user device 106 to define time window to access the accessing device 104. Then, the user 108 may also define a time window along with the credentials to access the accessing device 104. The defined time window may correspond to a time taken by the user 108 to reach the accessing device 104 after defining the credentials.

At step 408, the user device 106 may receive the defined credentials from the user 108 to access the accessing device 104 as explained in details above. The user device 106 may receive defined time window from the user 108.

At step 410, the user device 106 may transmit the defined credentials and/or the defined time window to a server 112 for providing access of the accessing device 104 to the user 108. The method flowchart may end at 412.

The present invention is applicable to various fields/industries such as, but not limited to, hospitality industry, real-estate industry, hostels, educational institutes, banking sector, automobile industry, and any such field/industry where the accessing device 104 can be used and is obvious to a person skilled in the art.

The present invention provides the following technical advantages over the existing solutions a) provides access of an accessing device to a user when a battery of a user device is low or reaches below a pre-determined threshold, b) eliminates usage of an access card or a key for providing access of an accessing device to a user, c) provides convenience to the user by providing easy access of the accessing device to the user in emergency situations, d) enables the user to define credentials and a time window to access of the accessing device, and e) enables the accessing device to receive the defined credentials and defined time window from a server for providing access of the accessing device to the user.

The embodiments of the invention discussed herein are exemplary and various modifications and alterations to a person skilled in the art are within the scope of the invention.

In one embodiment of the invention, the invention can be operated using the one or more computer readable devices. The one or more computer readable devices can be associated with a user device 106. A computer readable medium comprising one or more processors and a memory coupled to the one or more processors, the memory storing instructions which are executed by the one or more processors, the one or more processors configured to detect a charged status of a battery of a user device 106 and prompt a user 108 of the user device 106 to define credentials when the charged status of the battery reaches below a pre-determined threshold. The memory storing instructions which are executed by the one or more processors, the one or more processors configured to receive the credentials from the user 108 to access an accessing device 104 and to transmit the defined credentials to a server 112 for providing access of the accessing device 104 to the user 108.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures/Tables and described herein. Other examples of the invention may include different computer-executable instructions or components having more or less functionality than illustrated and described herein.

Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Furthermore, the terms "user," "subscriber," "customer," "consumer," "agent," and the like are employed interchangeably throughout the subject specification, unless context warrants particular distinction(s) among the terms. Such terms can refer to human entities or automated components supported through artificial intelligence (e.g., a capacity to make inference based on complex mathematical formalisms) which can provide simulated vision, sound recognition and so forth.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

We claim:

1. A system comprising:
a user device comprising:
a detection unit adapted to detect a charged status of a battery of the user device;
an interface adapted to prompt a user of the user device to define credentials when the charged status of the battery reaches below a pre-determined threshold and to receive the defined credentials from the user; and
a communication unit adapted to transmit the defined credentials to a server; and
an accessing device comprising:
a receiver adapted to receive the defined credentials from the server;
an interface adapted to receive credentials from the user;
a processor adapted to validate the credentials with the defined credentials; and
an access unit adapted to provide access of the accessing device to the user based on the validation;
wherein the interface of the user device is further adapted to prompt the user of the user device to define a time window to access the accessing device, wherein the communication unit of the user device is further adapted to transmit the defined time window to the server.

2. The system of claim 1, wherein the user device determines a time window automatically to access the accessing device when the credentials are defined by the user.

3. The system of claim 1, wherein the defined time window corresponds to a time taken by the user to reach the accessing device after defining the credentials.

4. The system of claim 1, wherein the receiver of the accessing device is adapted to receive the defined time window from the server.

5. The system of claim 1, wherein the server transmits the defined credentials and the defined time window to a camera.

6. The system of claim 5, wherein the camera transmits the defined credentials and the defined time window to the accessing device.

7. The system of claim 1, wherein the access unit is adapted to provide access of the accessing device to the user based on a positive validation and is adapted to restrict access of the accessing device to the user based on a negative validation.

8. The system of claim 1, wherein the interface of the accessing device receives the credentials from the user through a microphone associated with the accessing device.

9. The system of claim 1, wherein the user device activates a special mode arrival option for the user when the battery reaches below the pre-determined threshold, wherein the special arrival mode corresponds to using the defined credentials to access the accessing device by the user.

10. The system of claim 1, wherein the credentials comprise a password, a personal identification number, a rotation pattern for a handle associated with the accessing device, a voice command, an identification of the user by a camera, a biometric data or a combination thereof.

11. The system of claim 1, wherein the user device transmits the defined user credentials and the defined time window to the server through a mesh network or a cellular network.

12. The system of claim 1, wherein the detection of the charged status of the battery reaching below a pre-determined threshold is determined based on a location of the user device and a time required to reach the accessing device.

13. A system comprising:
a user device comprising:
a detection unit adapted to detect a charged status of a battery of the user device;
an interface adapted to prompt a user of the user device to define credentials when the charged status of the battery reaches below a pre-determined threshold and to receive the defined credentials from the user; and
a communication unit adapted to transmit the defined credentials to a server; and
an accessing device comprising:
a receiver adapted to receive the defined credentials from the server;
an interface adapted to receive credentials from the user;
a processor adapted to validate the credentials with the defined credentials; and
an access unit adapted to provide access of the accessing device to the user based on the validation;
wherein the communication unit adapted to transmit a notification to a front desk system through the server for encoding an access card when the charged status of the battery reaches below a pre-determined threshold, wherein the encoded access card provides access of the accessing device to the user.

14. The system of claim 13, wherein the user device is adapted to receive an alert from the server after the access card is encoded to allow access of the accessing device to the user.

15. The system of claim 13, wherein the user device is adapted to transmit a cancellation request to the front desk system for cancelling the request to encode the access card when the charged status of the battery reaches above a second pre-determined threshold.

16. A method comprising:
    detecting a charged status of a battery of a user device;
    prompting a user of the user device to define credentials when the charged status of the battery reaches below a pre-determined threshold;
    receiving the defined credentials from the user to access an accessing device;
    transmitting the defined credentials to a server for providing access of the accessing device to the user;
    prompting the user of the user device to define a time window to access the accessing device and transmitting the defined time window to the server.

17. The method of claim 16, wherein the user device receives the defined time window from the user, wherein the time window corresponds to time taken by the user to reach the accessing device after defining the user credentials.

18. A computer readable medium comprising a non-transitory memory, the memory storing instructions configured to be executed by one or more processors to perform:
    detecting a charged status of a battery of a user device;
    prompting a user of the user device to define credentials when the charged status of the battery reaches below a pre-determined threshold;
    receiving the defined credentials from the user to access an accessing device;
    transmitting the defined credentials to a server for providing access of the accessing device to the user;
    prompting the user of the user device to define a time window to access the accessing device and transmitting the defined time window to the server.

* * * * *